United States Patent [19]

Pircon

[11] Patent Number: 4,744,958
[45] Date of Patent: * May 17, 1988

[54] HETEROGENEOUS REACTOR

[76] Inventor: Ladislav J. Pircon, 305 Canterberry La., Oak Brook, Ill. 60521

[*] Notice: The portion of the term of this patent subsequent to May 18, 1993 has been disclaimed.

[21] Appl. No.: 845,614

[22] Filed: Mar. 28, 1986

Related U.S. Application Data

[63] Continuation of Ser. No. 388,921, Jun. 16, 1982, abandoned, which is a continuation-in-part of Ser. No. 846,033, Oct. 27, 1977, Pat. No. 4,358,433, which is a continuation-in-part of Ser. No. 677,750, Apr. 16, 1976, Pat. No. 4,209,502, which is a continuation-in-part of Ser. No. 467,083, May 6, 1974, Pat. No. 3,957,465.

[51] Int. Cl.$^4$ .................................................. B01D 47/00
[52] U.S. Cl. ............................... 422/193; 55/257 NP; 55/465; 261/116
[58] Field of Search ..................... 55/84–91, 55/240, 241, 465, 257 NP; 261/116, DIG. 54; 422/193

[56] References Cited

U.S. PATENT DOCUMENTS

| | | |
|---|---|---|
| 2,090,994 | 8/1937 | Brandes . |
| 3,853,506 | 12/1974 | Pircon . |
| 3,920,422 | 11/1975 | Pircon . |
| 3,957,465 | 5/1976 | Pircon . |
| 4,036,609 | 7/1977 | Pircon . |
| 4,073,634 | 2/1978 | Pircon . |

FOREIGN PATENT DOCUMENTS 519210  7/1976  U.S.S.R. ............................. 55/94

OTHER PUBLICATIONS

Gas Scrubbers–Schutte & Koerting Co., Cornwell Heights, Bucks County, Pa., dated 9/27/67.

*Primary Examiner*—Bernard Nozick
*Attorney, Agent, or Firm*—Thomas W. Speckman

[57] ABSTRACT

An apparatus for promoting heterogeneous chemical and physical reactions in a gas stream using a casing which is substantially liquid and gas tight having a gas inlet in one end and a gas outlet in the other end; nozzle means within the casing having an entry toward said one end in communication with the gas inlet and an outlet toward said other end, said nozzle means having an effective cross-sectional area of about 2 to about 64 times the effective cross-sectional area of the outlet and the mean angle of convergence of the nozzle being about 6° to about 20°; means in the casing for introduction of reactant liquids and solids into the gas stream before said nozzle means; means for removing liquid and particulate matter from said other end of the casing following desired reaction; and means for separately removing the gas from said other end of the casing. The apparatus and process of this invention is especially useful in providing a self-cleaning, non-clogging system for inducing high reaction kinetics without the normally required high turbulence and concurrent pressure drop of a scrubber; or packing to provide surface area such as used in conventional absorber.

23 Claims, 1 Drawing Sheet

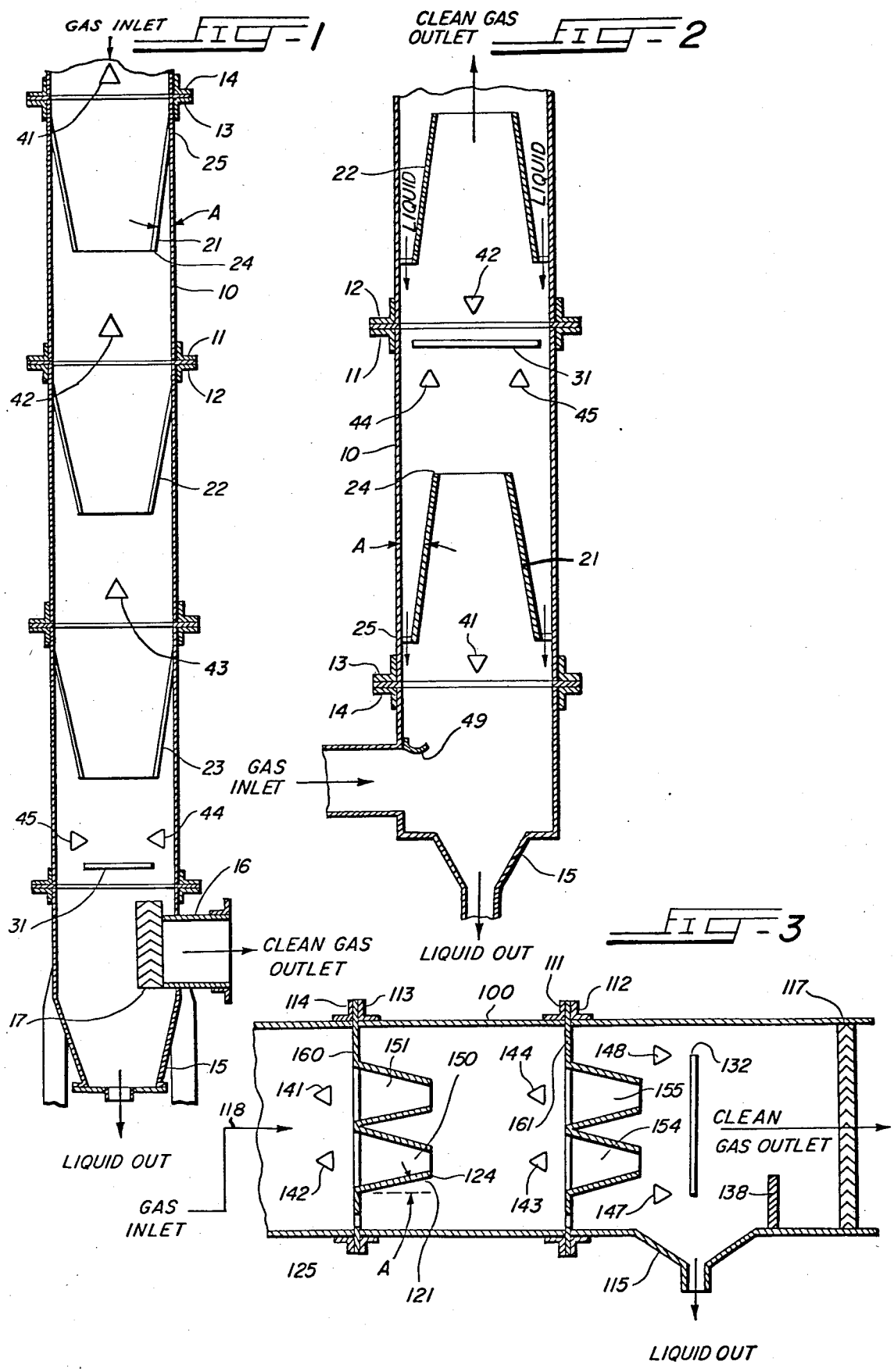

HETEROGENEOUS REACTOR

CROSS REFERENCE TO RELATED APPLICATIONS

This application is a continuation of co-pending application Ser. No. 388,921, filed June 16, 1982 now abandoned which is a continuation-in-part of application Ser. No. 846,033, filed Oct. 27, 1977, now U.S. Pat. No. 4,358,433, which is a continuation-in-part of application Ser. No. 677,750, filed Apr. 16, 1976, now U.S. Pat. No. 4,209,502, which is a continuation-in-part of application Ser. No. 467,083, filed May 6, 1974, now U.S. Pat. No. 3,957,465.

BACKGROUND OF THE INVENTION

1. Field of the Invention

This invention relates to an apparatus for promoting heterogeneous chemical and physical reactions in a gas stream. The apparatus induces high reaction kinetics between liquids or solids in a gas stream providing a self-cleaning, non-clogging apparatus without the normally required high turbulence and concurrent pressure drop of a scrubber, or packing to provide surface area as used in conventional absorbers.

2. Description of the Prior Art

A wide number of reactors are known to the art in attempts to maximize both physical and chemical reactions between matter in different states, that is, gaseous, solid and liquid or any combination thereof. Most of the prior reactors for such purposes have been of a batch type such as atmospheric or pressurized tanks or kettles and agitated tank reactors. Continuous reactors have been used where surface reactions are conducted such as contactor packed column reactors, turbulent or fluidized bed absorber-reactors, high turbulent flow scrubbers, or wetted wall or other contact reactors.

The prior art heterogeneous reactors have not been as efficient as desired in that the reactions take a longer time than desired and in the case of continuous reactors, often times the slower reactions do not permit the desired completion of reaction to be achieved, or greatly enlarged apparatus is required to increase the residence time. Another serious disadvantage with prior continuous heterogeneous reactors has been problems of plugging when solid state materials are involved. Another serious disadvantage is high pressure drop, with concurrent high energy consumption, of high turbulent flow scrubbers or contact reactors.

Prior art Venturi nozzles are one type of device for promotion of turbulence in the gas stream which necessitate a very rapid gas flow rate wherein the Venturi evolute shape of the nozzle is needed to achieve the high degree of main stream turbulence. In other words, Venturi nozzles must be a definite shape which inherently induces turbulence and which provides controlled acceleration and controlled deceleration of a gas stream passing therethrough. It is recognized that the efficiency of Venturi scrubbers increases with gas inlet velocity to a point of maximum efficiency and above that velocity efficiency decreases as the excessive turbulence shatters particulates. The applicant does not know of any Venturi scrubbers which may be operated without 15 to 40 times the amount of liquid used in the apparatus of this invention.

It is an object of the present invention to provide an apparatus for conducting reactions between reactants in different states which is highly efficient and useful in a wide variety of applications.

It is another object of this invention to provide an apparatus for the conduct of reactions involving multiple states which induces high reaction kinetics.

Still another object of this invention is to provide an apparatus which is self-cleaning and non-clogging.

Yet another object of this invention is to provide an apparatus for the conduct of highly efficient reactions between gaseous and solid matter in high temperature gas streams.

A further object of this invention is to provide an apparatus for the conduct of reactions between matter in multiple states under high pressure conditions.

Another object of this invention is to provide an apparatus for continuous reaction between matter of multiple states without the excessive energy losses accompanying high turbulence reactors or drag force losses due to packing in packed stages or columns.

A further object of this invention is to provide an apparatus for evaporating liquids at a very high rate enabling the desired evaporation to take place in a short period of time and in a short path length.

Still another object of this invention is to provide an apparatus to cool gases in contact with liquid which is caused to evaporate by the absorption of heat from the hot gas.

Yet another object of this invention is to provide an apparatus which may be operated with little or no liquid and provide highly efficient reactions at low gas velocities.

The above and other objects and features of the invention will become apparent from the following description and figures showing preferred embodiments wherein:

FIG. 1 shows a cross-sectional view of one embodiment of an apparatus of this invention using single nozzles in vertical series wherein the gas stream passes downwardly;

FIG. 2 shows a cross-sectional view of another embodiment of an apparatus of this invention using single nozzles in vertical series wherein the gas stream passes upwardly; and FIG. 3 shows a cross-sectional view of another embodiment of the apparatus of this invention having multiple nozzles in each stage and the gas stream flowing horizontally.

DESCRIPTION OF PREFERRED EMBODIMENTS

Referring to FIG. 1, the heterogeneous reactor is shown defined by outer casing 10. The cross-sectional shape of outer casing 10 is preferably cylindrical, but may be square, rectangular, triangular, hexagonal, or other symmetrical polygon shape. Other geometrical shapes symmetrical with respect to the axis of the apparatus are satisfactory, the principal requirement being that it enclose the apparatus in generally liquid and gas tight relationship while providing controlled gas flow through the interior portion. To allow maximum flexibility in the utilization and maintenance of the heterogeneous reactor, casing 10 may be fabricated in sections with the sections having flanges as shown by 11 and 13 at opposite ends for rigid coupling to adjacent casing sections having like flanges 12 and 14. Instead of the flanges as shown in FIG. 1, any suitable coupling means may be utilized. To allow for maximum economy of original fabrication and in installation of larger units the sections may be welded prior to shipment and erection.

FIG. 1 shows a three stage heterogeneous reactor. The heterogeneous reactor is arranged with its axis vertically having the reactant solid-liquid-gas inlet in the upper portion. The inlet may be in either a vertical or horizontal position. The gas flow is supplied to the top of casing 10 through the inlet at a velocity and pressure sufficient to carry it through the apparatus or flow may be induced by an exhaust blower at the gas outlet. The heterogeneous reactor of this invention may be operated under positive or negative pressures suitable for the desired reaction or evaporation or cooling objective, limited only by the materials of construction. Casing velocities can be chosen to optimize the reactions such as low velocities where high absorption efficiencies are desired to high velocities where closed loop recycle without the need for demisting is permitted.

Spray 41 may be located in the central portion of inlet to cylinder 10 and introduces liquid or solid reactant, adsorbent, absorbent or coolant in droplet form to the reactant stream, the droplets being preferably in the order of about 40 to about 1500 microns in diameter. Larger droplets may be desired to compensate for evaporation when evaporative conditions exist if it is desired that the droplets leave the cone without excessive reduction in size of the droplet to achieve other desired reactions. Spray 41 is preferably a solid cone spray. However, high gas pressure or vibratory disc assisted sprays may be used. For certain applications, a fan, hollow cone, or spinning disc atomizing spray in combination with several like it may be arranged in a pattern permitting the introduction of droplets of liquid across the entire cross section of the pollutant gas stream prior to entry of the gas stream into cone 21. Different sized liquid droplets are desired to provide maximum differential accelerations, decelerations and velocities through the apparatus, thus increasing reaction rates. It is desired that the spray pattern extend across the full area entrance 25 of nozzle 21 and any suitable pattern of sprays or multiple sprays is satisfactory. Spray 41, designed to disperse solids, may also be used to introduce solid particles of the above specified sizes to the reactant stream at the entrance 25 of nozzle 21.

The reactant containing heterogeneous solid-liquid-gas stream enters converging nozzle 21 through entry 25. It is preferred that the entry be round and the nozzle conical, but other geometrical shapes symmetrical with respect to the axis of the apparatus are satisfactory. The cone ratio, defined as the effective cross-sectional area of the entry divided by the effective cross-sectional area of the outlet, should be about 2 to about 64, about 2 to about 36 being preferred, with about 2 to about 12 being especially preferred for many low pressure drop processes. By effective cross-sectional area is meant the area at 90° to the axis of gas flow.

The length of the converging portion of the nozzle is determined by the angle of convergence shown as A in FIG. 1 and the nozzle ratio as defined above. It is preferred that the mean angle of convergence be about 6° to about 20°, about 8° to about 18° being preferred and about 12° to 16° especially preferred for many low pressure drop processes. By mean angle of convergence is meant the angle measured between a straight line drawn from the entry to the outlet and a vertical line as shown by A in FIG. 1. The sides at entry and/or outlet may be curved, or flared, to reduce pressure drops due to entry compression or outlet expansion.

When used to induce evaporation of a volatile liquid such as gasoline or other petroleum distillate or fuel into the intake stream of an internal combustion engine, I have found the cone ratio of about 2 to about 4 and an angle of convergence of about 12° to about 16° to be especially suitable.

For reactions not requiring separation of solid and liquid phases from the gas phase, or mass transfer phenomena such as associated with evaporative processes such as take place in the cooling tower, an impingement surface is not used in the gas stream beyond the nozzle exit. In FIG. 1, nozzles 21 and 22 do not have any impingement means, such as plates, associated with them. In FIG. 1, nozzle 23, the last nozzle in the series, does have an impingement means for removing liquid and solid particulates from the gas stream before the clean gas outlet. A suitable impingement plate is shown as 31 in FIG. 1. Impingement plate 31 is of sufficient size to have substantially all of the liquid-solid matter from the outlet of nozzle 23 impinge upon it while affording sufficient area between the impingement plate and cylinder 10 to allow passage of the gas around impingement plate without appreciable pressure drop. While impingement plate 31 is shown as a flat plate, a slightly concave plate to facilitate the passage of gas around the edges and to facilitate the removal of particulate matter may be utilized.

The distance from the outlet of the nozzle to the impingement surface 31 should be about 1.3 to about 2.5 times the diameter of outlet 24, about 1.6 to about 2.0 being preferred.

Additional sprays shown as 44 and 45 may be suitably located so that the spray therefrom washes particulate matter off impingement plate 31 for progress through the apparatus and discharge from the liquid outlet. Such sprays may be multiple sprays located around the periphery of impingement plate 31 or a satisfactory spray may be located in the central position or a spray may be located to spray obliquely upon the plate. When sufficient fluid is used, the impingement surface will be the fluid itself and the particulate matter will not strike or adhere to the impingement plate, but will be entrapped in the fluid. An important criteria of the sprays upon impingement plate 31 is that they provide sufficient fluid with sufficient force and direction to keep impingement plate 31 relatively free of particulate matter. The reactor may also be operated without the supplemental sprays to clean the impingement surfaces.

Because of the unitized construction of the apparatus of this invention, as shown in FIG. 1, multiple nozzle-impingement means stages may be readily placed one on top of the other, resulting in the series of three units as shown in FIG. 1. One to about 6 of the series connected stages of nozzles are suitable for many heterogeneous reactors for use in this invention. Preferably 2 to 4 stages are utilized in series. Any number of stages of nozzles may be utilized in series as is found necessary to carry the chemical or physical reaction to desired completion. The nozzle stages placed in series may provide different reaction properties by the nozzles having different inlet-outlet area ratios and different angles of convergence and may be arranged with multiple nozzles in each stage to shorten the overall length of the apparatus. Where space requirements are limiting, the stages need not be in line, but may be at right angles to each other or any other angle to allow casing 10 to bend or curve to fit into available space. The number of stages or nozzles is controlled by the difficulty of reaction of the reactants, and with especially difficult materials, a greater number of stages may be necessary. This would also be influenced by the angles of convergence or effective cross-sectional area ratios of the nozzles.

Beneath the bottom stage, as shown in FIG. 1, is reservoir 15 for removal of the liquid and slurry. Exit means for the removal of the gas are also provided as shown in FIG. 1 as conduit 16. Either within the apparatus or external to the apparatus it may be preferred to have demister 17 in the clean gas effluent line to remove fine droplets of liquid remaining in the gas stream together with any solids or gases trapped by such droplets. Again, where closed loop recycling is involved in a chemical process, it may be desired to eliminate the demisters so that the droplets in mixture with the gas and solids may continue reacting until such mixture returns to the reactor.

The vertical arrangement of the converging nozzles is particularly advantageous since using such an apparatus having a demister and a nozzle ratio of 4 and a nozzle angle of approximately 15°, the pressure drop in one nozzle is 3.5 inches of water; with two nozzles in series is 5.7 inches of water; with three nozzles in series is 7.0 inches of water; and with four nozzles in series is 8.3 inches of water when an inlet velocity of approximately 2100 feet per minute was used. Thus, it is seen that the pressure drop of the vertical series of nozzles is advantageously less than cumulative. It has been found that the pressure drop across a two stage heterogeneous reactor, both stages having an impingement plate of the type shown in FIG. 1 designed to accommodate approximately 2100 feet per minute inlet velocity, is 0.9 inch of water using a nozzle ratio of 4 and a nozzle angle of approximately 12° when an inlet velocity of about 380 feet per minute was used in the removal of sulfur oxides from effluent gases from the combustion of coal.

The second stage nozzle 22, as shown in FIG. 1, is identical in configuration to the first stage. It is recognized, however, that the water or liquid chemical supplied to both the nozzles preceding the cone entrance and the nozzles supplying liquid to the impingement surface of the same stage or of different stages may be individually controlled. That is, the volumes may be different and the liquid used may be different in each instance.

The passing of the liquid, solid and gaseous reactant in the stream through nozzles such as 21, promotes intimate contact between the liquid, solid and gaseous reactant and results in desired high reaction rates. It is believed the high reaction efficiency of the heterogeneous reactor and process is due to differential velocities and differential acceleration and deceleration achieved by the combination of non-compressible matter passing with the compressible gas through nozzle 21 with the opportunity for relatively great expansion following exit from nozzle exit 24. In the reactant containing stream there is a size range of compressible and non-compressible matter. Additional particles added to the gas stream by addition of solids or liquid droplets are principally non-compressible as desired to increase the non-compressible component of the gas stream. Spray 41 may be used to introduce a wide selection of liquid or solid particle sizes to the gas stream and together with a relatively wide span of liquid or solid particle sizes in the inlet gas stream, promote extremely high collision rates and high compressible gas rates flowing past the non-compressible particles and droplets resulting in very highly efficient reactions.

FIG. 2 shows another embodiment of an apparatus according to this invention. In the apparatus shown in FIG. 2, the gas stream passes upwardly through nozzles 21 and 22. The corresponding parts of the apparatus have the same numbers as in FIG. 1 and function in the same manner. In the apparatus shown in FIG. 2, the nozzles are mounted inwardly from casing 10 in such a manner that liquids and liquids containing solids may flow downwardly along the inside of casing 10. Liquid trough 49 is provided to prevent the liquid from passing over the gas inlet. The configuration shown in FIG. 2 is especially suitable for installation in existing or new conventional updraft stacks or a collection hood stack.

In order to minimize the height or length of the apparatus of my invention as shown in FIG. 1, I have found that multiple cones may be placed in each stage as shown in FIG. 3. The embodiment as shown in FIG. 3 has outer casing 100 which is substantially liquid and gas tight having gas inlet 118 at one end and clean gas outlet at the other end. Casing 100 may have flanges as shown by 111 and 113 at each end for coupling to adjacent casing sections having like flanges 112 and 114. The first stage as shown in FIG. 3 has plate 160 through which gas nozzles 150 and 151 are arranged. Any number of gas nozzles which have the properties as previously set forth, are suitable, from about 2 to about 6 being preferred in a single stage.

In a similar manner to that previously described, liquid or solid particles may be added by sprays above the gas nozzle inlets, such as sprays 141 and 142 above the inlet to nozzles 151 and 150, respectively. There is no impingement means beyond the outlet of nozzles 150 and 151 and the gas expands prior to entry into the nozzles of the second stage.

The gas stream passes through the converging nozzles and may impinge upon an impingement surface beyond the nozzle exits as exemplified by impingement plate 132. As previously described, the impingement surface may be an impingement plate shown and may have liquid sprays to aid washing particulate matter off the impingement plate shown as 147 and 148. The impingement plate beyond multiple nozzles may also be a series of separate plates having a geometry such that a gas flow passes from each nozzle for impingement upon a corresponding impingement surface following which the gas flows freely around that impingement surface for passage to the volume beneath the impingement plate assembly.

Liquid well 115 is provided for removal of liquid containing particulate and/or chemical matter and means for its removal. Drainage holes may also be provided in the plates holding the nozzles as shown so that liquid well 115 drain the entire apparatus. Exit means are shown for removal of the gas from the end of the apparatus opposite the gas inlet. A demister shown as 117 is preferred when the apparatus is utilized with liquid sprays to remove fine droplets of liquid remaining in the clean gas.

With the utilized construction of the apparatus of this invention, multiple units may readily be placed at one end of one another resulting in a series of two units as shown in FIG. 3. One to about six of the series connected stages of multiple nozzles are suitable for an apparatus of this invention, preferably 2 to 4 nozzle-impingement means stages are utilized in series. The unitized arrangement referred to earlier in FIG. 1 would also apply here. Also, as seen from the drawings, the apparatus may be arranged so that the gas flow is downward, upward or horizontal. Of course, the gas flow may also be oblique and as previously described, the apparatus may have turns or bends to fit into physical space requirements.

The apparatus and process of this invention is suitable for absorption, gas-liquid, gas-solid or gas-liquid-solid chemical reactions, polymerization, vaporization, adsorption, stripping, gaseous cooling and condensation reactions which involve more than one phase of matter. The gas phase may be or carry a gaseous reactant or may be inactive with respect to the reaction desired. Likewise, introduced solids and liquids may be reactants or inactive with respect to the reaction desired. The process may involve a chemical or physical process separately or both chemical and physical processes may take place simultaneously. One stage may be particularly designed for a chemical or physical reaction and another stage in the same unit designed for the other type of reaction. It is thus seen that the apparatus and process of this invention provides great process versatility.

The apparatus and process of this invention provides much greater latitude in operational conditions, including flow, than conventional scrubbers or absorbers using packing would permit. The apparatus and process of this invention also provides much greater latitude in operational conditions than pollution abatement particle removal devices. Operation of the apparatus and process of this invention is, to a great extent, dependent upon relative velocities in the nozzles and not to a great extent upon velocity of the introduced gas stream. An apparatus of this invention designed for 2100 FPM was operated at 18% of design flow rate, dropping the Reynolds Number to 18% of design, and satisfactory reaction of over 95% was obtained. Likewise, the liquid flow rate was increased by a factor of 8 while maintaining reactions of over 95%. Thus, liquid to gas ratio changes of 0.5 to 20 were effected while maintaining high reaction efficiencies. This demonstrates that the apparatus of this invention has the process vesatility of responding to changing modes of process operation involving liquid recycle ratios and gas flow changes permitting it to function in operations from a gas cleaning system to being an integral part of a chemical process for manufacturing purposes with minimal adjustment, such as higher capacity liquid nozzles. By changing from liquid to solid spray nozzles the apparatus would operate in the dry mode at high temperatures. Conventional packed bed or Venturi scrubbers would not operate under such varied conditions without design changes to the apparatus.

The continually converging nozzle apparatus of this invention, due to its configuration, is dependent upon Brownian, Stokes and Einstein's relationships which render higher reaction rates independent of entrance velocity increases. The apparatus of this invention is dependent in its operation upon the ratio of the effective cross-sectional area of the nozzle inlet to the nozzle outlet and the mean angle of convergence of the nozzle, as well as the critical distance of the impingement means from the outlet of the nozzle in order to retain plug flow of the gas stream prior to contact with an impingement surface. If the impingement means is a greater distance than specified from the outlet of the nozzle, undesired flow patterns will result in the gas stream. The apparatus creates differential velocities and differential accelerations and decelerations between the various sized non-compressible liquids and solids and compressible gas passing through the nozzle substantially only along the axis of the nozzle to result in the high reaction efficiencies while maintaining desired low pressure drops. Since the thickness of the stagnant layer surrounding the absorbing droplet or solid particle, is contained in the denominator of the mathematical relationship designed to quantify the overall mass or heat transfer coefficient, normally designated as U, the thinner the stagnant layer becomes, approaching zero, it is seen that U would approach infinity. This means that infinite rates of reaction, vaporization, adsorption or agglomeration would be theoretically approached using the apparatus of this invention, as opposed to velocity limitations of conventional scrubbers or absorbers.

The Venturi nozzle, directly contrary to the apparatus of this invention, is dependent upon Venturi's laws of flow, aspiration, absorption, adsorption and agglomeration requiring high velocities which result in high pressure drops and in the case of liquid scrubbing, large amounts of liquid. Venturi Scrubbers require in the order of 20 to 90 gallons of liquid per 1000 cubic feet of gas. A commercial scale single cone, single stage apparatus according to the present invention having an angle of covergence of 6.5° and cone ratio of 4:1 was used to remove fly ash, $SO_x$, and $NO_x$ from pulverized coal boiler flue gas. The flue gas was passed through the apparatus at 25,000 to 34,000 ACFM at input velocities of 640 to 1250 FPM resulting in compliance with State of North Carolina emission standards with use of only 0.8 gallons of liquid per 1000 cubic feet of gas.

The process using the apparatus of this invention for inducing chemical and physical reactions in gas streams comprises passing a gas stream and solid or liquid through a nozzle within the casing and having an entry in communication with the gas inlet, the entry of the nozzle having an effective cross-sectional area of about 2 to about 64 times the effective cross-sectional area of the outlet and the mean angle of convergence of the nozzle being about 6° to about 20°, the acceleration and deceleration of the gas stream causing at least two states of gas, solids and liquids to contact causing chemical and physical reaction of reactants in passing through the nozzle; removing the liquid and solid particulate matter from the other end of the casing; separately removing the gas from the other end of the casing. The liquids or solids and agglomerates thereof may be impinged upon an impingement means beyond the nozzle outlet for separation from the gas stream.

The following examples are set forth to illustrate specific embodiments of this invention and are not to be construed to limit the invention in any way.

EXAMPLE I

An apparatus as shown in FIG. 1 and previously described with respect to FIG. 1, was used to produce liquid fertilizer from pretreated defluorinated phosphate rock. Coal containing about 6.2 wt. percent sulfur on a dry basis was fed by an underfeed stoker and burned in a double pass fire tube boiler with excess air and the stack gases passed from the boiler into the bottom of a cooling tower similar to a single stage of the apparatus as shown in FIG. 2 without an impingement plate. The boiler effluent gas stream passed through the cooling tower and then through a two stage heterogeneous reactor as shown in FIG. 1 having impingement plates under each nozzle outlet. The cone ratio of inlet to outlet was about 4 to 1 and the angle of convergence was about 12°. Defluorinated phosphate rock, containing less than about 0.18% F, was pretreated by soaking in tap water for two weeks. Water and pretreated defluorinated phosphate rock only were added to a tank to obtain pH's for recycle of liquid at pH at 6.90 to nozzle sprays in the heterogeneous reactor and a pH of 6.50 in the liquid passing from the heterogeneous reactor to the cooling tower liquid spray. Sulfur dioxide removal from the stack gas of 92.5% was obtained.

It was found that when ammonia was added to the system in addition to water and defluorinated phosphate rock as described above, removal efficiencies of sulfur oxides increased to in excess of 96% and conversion of the phosphate rock and ammonia reached 90% based upon reaction products of calcium sulfite, calcium sulfate and ammonium phosphate. This resulted in $SO_2$ effluent from the heterogeneous reactor of as low as 90 ppm while burning 6.2% coal, well below United States of America Federal Environmental Agency allowable amounts.

EXAMPLE II

A two stage heterogeneous reactor similar to the apparatus as shown in FIG. 2 was installed to treat the vapors issuing from a hamburger and onion frying grill. Fresh water was used in spray nozzles in the gas stream before each nozzle. It was found that the effluent stream was free from odors of hot grease, hamburger and onions. Return of the warm effluent stream to the room provides considerable heat conservation. The heat from the grills of a restaurant could be salvaged, conserving water by recycle, by adding appropriate oxidizing agents to the recycled solution to sanitize the air while deodorizing it.

EXAMPLE III

A single stage heterogeneous reactor of this invention having a single cone with the mean angle of convergence of 12°–15° and inlet to outlet area ratio of 2 to 3 was installed between a two barrel automobile carburetor and the manifold carburetor mount to further vaporize the incoming atomized gasoline. It was found that gasoline mileage increased up to 23% and $CO_2$ exhaust emission reduced by factors as large as ten times. A ratio of 2 to 4 was used in the same position with a four barrel carburetor resulting in a gasoline mileage increase from 10 to 17% without the benefit of optimized dwell, spark and carburetor adjustments achieved with the two barrel unit.

EXAMPLE IV

The effect of velocity entering the large diameter of a conical nozzle in an apparatus of this invention was used to measure particle removal efficiency in passage of a gas stream containing particulates. Conical nozzles had varying ratios of inlet to outlet areas from 2:1 to 6:1 as indicated. All of the conical nozzles had a mean angle of convergence of 6.5°. Sub-micron coal dust contained in an air stream was passed through three conical nozzle configurations under conditions and with particulate removal efficiencies shown:

TABLE

| Cone Ratio | Velocity (feet per minute) | | | | | |
|---|---|---|---|---|---|---|
| | 650 | | 1250 | | 1800 | |
| | ΔP* | % Effic. | ΔP* | % Effic. | ΔP* | % Effic. |
| 2:1 | 0.6 | 96.0 | — | — | 2.8 | 96.3 |
| 4:1 | 2.7 | 97.3 | 3.7 | 97.6 | 5.2 | 92.2 |

TABLE-continued

| Cone Ratio | Velocity (feet per minute) | | | | | |
|---|---|---|---|---|---|---|
| | 650 | | 1250 | | 1800 | |
| | ΔP* | % Effic. | ΔP* | % Effic. | ΔP* | % Effic. |
| 6:1 | 9.8 | 98.2 | 11.2 | 98.7 | — | — |

*inches of water

It is noted that entering velocity had very little direct effect upon removal efficiency.

EXAMPLE V

The effect of entering velocity into the conical nozzle of an apparatus of this invention was measured using magnesium oxide aerosol having all particles less than 0.1 micron diameter. The nozzle had a mean angle of convergence of 6.5° and an inlet area:outlet area ratio indicated.

TABLE

| Cone Ratio | Velocity (Feet per minute) | | | | | |
|---|---|---|---|---|---|---|
| | 650 | | 1250 | | 1800 | |
| | ΔP* | % Effic. | ΔP* | % Effic. | ΔP* | % Effic. |
| 2:1 | 0.6 | 10.5 | — | — | 3.0 | 4.7 |
| 6:1 | 9.8 | 76 | 11.2 | 33.2 | — | 4.7 |

*inches of water

The results show significant increase in removal efficiency with reduced entrance velocity. In order to obtain in the order of 7 percent removal of particulates from the same magnesium oxide aerosol stream using a Venturi nozzle, a minimum of about 60 inches water pressure drop with correspondingly high inlet velocities would be required. The data set forth above showing increased removal efficiency with decrease in inlet velocity is just the opposite effect than is obtained with a Venturi apparatus.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A low pressure drop apparatus, having pressure drop of less than that characteristic of high turbulence reactors, for promoting heterogeneous chemical and physical reactions in a gas stream by cocurrent movement of said gas stream and reactant liquids or solids comprising:

a casing which is substantially liquid and gas tight having a gas inlet in one end and a gas outlet in the other end and means capable of introducing said gas stream through said inlet at a velocity of about 380 to about 2100 feet per minute;

two to six straight sided continually converging nozzle means having a common axis and each said nozzle symmetrical with respect to its axis within said casing having an entry at one end in communication with said gas inlet and an outlet at the other end, said entry being unrestricted allowing entry of all said reactant liquids or solids and being in substantially closed relation to said casing to avoid substantial bypass of said nozzle and having an effective cross-sectional area of about 2 to about 64 times the effective cross-sectional area of said outlet and the mean angle of convergence of said nozzle being about 6° to 20°, said outlet being formed by the end of straight continually converging sides of said nozzle means and being unrestricted allowing passage of all said reactant liquids or solids, said nozzle means having unrestricted flow of said gas stream and said reactant liquids or solids therethrough creating substantially only along the axis of said nozzle means differential velocities and differential accelerations and decelerations between said variable sized non-compressible liquids or solids and the compressible gas passing through said nozzle maintaining plug flow of said gas stream and creating pressure drops less than about 11.2 inches of water promoting said reactions;

reactant introduction means in said one end of said casing prior to said entry to said converging nozzle means for introduction of said reactant liquids or solids as variable sized non-compressible liquids or solids;

means for removing liquid and particulate matter from said casing following desired reaction; and means for removing the gas separately from the liquid and particulate matter from said other end of said casing, said gas being removed without passage through any liquid pool.

2. The apparatus of claim 1 wherein a spray means introduces solid particles of differing sizes between about 40 to about 1500 microns in diameter to the gas stream prior to said nozzle.

3. The apparatus of claim 1 wherein 2 to about 6 single nozzle stages are in series within said casing.

4. The apparatus of claim 1 having 2 to about 6 multiple nozzle stages each said nozzle stage having 2 to about 6 nozzles.

5. The apparatus of claim 1 wherein the pressure drop is 3.5 inches of water and less across each nozzle stage.

6. The apparatus of claim 1 wherein said mean angle of convergence is about 8° to 18°.

7. The apparatus of claim 1 wherein said entry of the nozzle has an effective cross-sectional area about 2 to about 36 times the cross-sectional area of the nozzle outlet.

8. The apparatus of claim 1 wherein said mean angle of convergence is about 12° to about 16° and said entry of the nozzle has an effective cross-sectional area about 2 to about 4 times the effective cross-sectional area of the nozzle outlet.

9. The apparatus of claim 1 additionally having impingement means beyond said nozzle outlet at a distance from said outlet of about 1.3 to about 2.5 times the diameter of said outlet to retain said plug flow of said gas stream prior to said impingement means and sized to insure impingement thereon of substantially all liquid and particulate matter entrained in the gas stream passing from said nozzle outlet.

10. The apparatus of claim 1 wherein said mean angle of convergence is about 12° to about 16°.

11. The apparatus of claim 1 wherein a spray means introduces liquid in droplet form to the gas stream prior to said nozzle entry.

12. The apparatus of claim 11 wherein said spray means introduces droplets about 40 to about 1500 microns in diameter and in an amount of about 0.8 gallons liquid per 1000 cubic feet of said gas.

13. A low pressure drop apparatus, having pressure drop of less than that characteristic of a high turbulence reactor, for promoting heterogeneous chemical and physical reactions in a gas stream by cocurrent movement of said gas stream and reactant liquids or solids comprising:

a vertical casing which is substantially liquid and gas tight having a gas inlet in the upper end and a gas outlet in the lower end and means capable of introducing said gas stream through said inlet at a velocity of about 380 to about 2100 feet per minute;

two to six straight sided continually converging nozzle means having a common axis and each said nozzle symmetrical with respect to said axis within said casing having an entry at the upper end in communication with said gas inlet and an outlet at the lower end, said entry being unrestricted allowing entry of all said reactant liquids or solids and being in substantially closed relation to said casing to avoid substantial bypass of said nozzle and having an effective cross-sectional area of about 2 to about 64 times the effective cross-sectional area of said outlet and the mean angle of convergence of said nozzle being about 6° to 20°, said outlet being formed by the end of straight continually converging sides of said nozzle means and being unrestricted allowing passage of all said reactant liquids or solids, said nozzle having unrestricted flow of said gas stream and said reactant liquids or solids therethrough creating substantially only along the axis of said nozzle means differential velocities and differential accelerations and decelerations between various sized non-compressible liquids or solids and the compressible gas passing through said nozzle maintaining plug flow of said gas stream and creating pressure drops of less than about 11.2 inches of water promoting said reactions;

spray means in said casing for introduction of said reactant liquids or solids as variable sized non-compressible liquids or solids to said gas stream prior to each said nozzle entry;

solid plate impingement means beyond at least one of said nozzle outlets at a distance from said outlet of about 1.3 to about 2.5 times the diameter of said outlet to retain said plug flow of said gas stream prior to said impingement means and sized to insure impingement thereon of substantially all liquid and particulate matter entrained in the gas stream passing from said nozzle outlet;

means for removing liquid and particulate matter from said lower end of said casing following desired reaction; and means for removing the gas separately from the liquid and particulate matter from said lower end of said casing, said gas being removed without passage through any liquid pool.

14. The apparatus of claim 13 wherein a spray means introduces solid particles of differing sizes between about 40 to about 1500 microns in diameter to the gas stream prior to said nozzle entry.

15. The apparatus of claim 13 wherein the pressure drop is 3.5 inches of water and less across each stage.

16. The apparatus of claim 13 wherein said mean angle of convergence is about 8° to 18°.

17. The apparatus of claim 13 wherein said entry of the nozzle has an effective cross-sectional area about 2 to about 36 times the cross-sectional area of the nozzle outlet.

18. The apparatus of claim 13 wherein said mean angle of convergence is about 12° to about 16° and said entry of the nozzle has an effective cross-sectional area about 2 to about 4 times the effective cross-sectional area of the nozzle outlet.

19. The apparatus of claim 13 wherein said mean angle of convergence is about 12° to about 16°.

20. The apparatus of claim 13 wherein a spray means introduces liquid in droplet form to the gas stream prior to said nozzle.

21. The apparatus of claim 20 wherein said spray means introduces droplets of differing sizes between about 40 to about 1500 microns in diameter and in an amount of about 0.9 gallons liquid per 1000 cubic feet of said gas.

22. A low pressure drop apparatus, having pressure drop of less than that characteristic of high turbulence reactors, for promoting heterogeneous chemical and physical reactions in a gas stream by cocurrent movement of said gas stream and reactant liquids or solids consisting of:
  a casing which is substantially liquid and gas tight having a gas inlet in one end and a gas outlet in the other end and means capable of introducing said gas stream through said inlet at a velocity of about 380 to about 2100 feet per minute;
  two to six straight sided continually converging nozzle means having a common axis and each said nozzle symmetrical with respect to its axis within said casing having an entry at one end in communication with said gas inlet and an outlet at the other end, said entry being unrestricted allowing entry of all said reactant liquids or solids and being in substantially closed relation to said casing to avoid substantial bypass of said nozzle and having an effective cross-sectional area of about 2 to about 64 times the effective cross-sectional area of said outlet and the mean angle of convergence of said nozzle being about 6° to 20°, said outlet being formed by the end of straight continually converging sides of said nozzle means and being unrestricted allowing passage of all said reactant liquids or solids, said nozzle means having unrestricted flow of said gas stream and said reactant liquids or solids therethrough creating substantially only along the axis of said nozzle means differential velocities and differential accelerations and decelerations between the various sized non-compressible liquids or solids and the compressible gas passing through said nozzle maintaining plug flow of said gas stream and creating pressure drops less than about 11.2 inches of water promoting said reactions;
  reactant introduction means in said one end of said casing prior to said entry to said converging nozzle means for introduction of said reactant liquid or solids;
  means for removing liquid and particulate matter from said casing following desired reaction; and
  means for removing the gas separately from the liquid and particulate matter from said other end of said casing, said gas being removed without passage through any liquid pool.

23. A low pressure drop apparatus, having pressure drop of less than that characteristic of a high turbulence reactor, for promoting heterogeneous chemical and physical reactions in a gas stream by cocurrent movement of said gas stream and reactant liquids or solids consisting of:
  a vertical casing which is substantially liquid and gas tight having a gas inlet in the upper end and a gas outlet in the lower end and means capable of introducing said gas stream through said inlet at a velocity of about 380 to about 2100 feet per minute;
  two to six straight sided continually converging nozzle means having a common axis and each said nozzle symmetrical with respect to said axis within said casing having an entry at the upper end in communication with said gas inlet and an outlet at the lower end, said entry being unrestricted allowing entry of all said reactant liquids or solids and being in substantially closed relation to said casing to avoid substantial bypass of said nozzle and having an effective cross-sectional area of about 2 to about 64 times the effective cross-sectional area of said outlet and the mean angle of convergence of said nozzle being about 6° to 20°, said outlet being formed by the end of straight continually converging sides of said nozzle means and being unrestricted allowing passage of all said reactant liquids or solids, said nozzle having unrestricted flow of said gas stream and said reactant liquids or solids therethrough creating substantially only along the axis of said nozzle means differential velocities and differential accelerations and decelerations between various sized non-compressible liquids or solids and the compressible gas passing through said nozzle maintaining plug flow of said gas stream and creating pressure drops of less than about 11.2 inches of water promoting said reactions;
  spray means in said casing for introduction of said reactant liquids or solids to said gas stream prior to each said nozzle entry;
  solid plate impingement means beyond at least one of said nozzle outlets at a distance from said outlet of about 1.3 to about 2.5 times the diameter of said outlet to retain said plug flow of said gas stream prior to said impingement means and sized to insure impingement thereon of substantially all liquid and particulate matter entrained in the gas stream passing from said nozzle outlet;
  means for removing liquid and particulate matter from said lower end of said casing following desired reaction; and
  means for removing the gas separately from the liquid and particulate matter from said lower end of said casing, said gas being removed without passage through any liquid pool.

* * * * *